Patented Aug. 2, 1927.

1,637,851

UNITED STATES PATENT OFFICE.

OAKLEY M. BISHOP, OF WILMINGTON, DELAWARE, ASSIGNOR TO E. I. DU PONT DE NEMOURS & COMPANY, OF WILMINGTON, DELAWARE, A CORPORATION OF DELAWARE.

CHLORO DERIVATIVES OF N-DIHYDRO-1,2,1',2'-ANTHRAQUINONE-AZINE AND PROCESS OF MAKING SAME.

No Drawing.      Application filed June 24, 1922. Serial No. 570,727.

This invention relates to new poly-chloro-derivatives of N-dihydro-1,2,1',2'-anthraquinone-azine having greener shades and greater fastness to chlorine than the chlorinated azine-derivatives heretofore produced; the invention also pertains to processes of making these new chloro-derivatives.

Various methods are given in the literature for the production of halogen derivatives of the above mentioned azine, the most commonly used method consisting in the treatment of the azine with aqua regia. Another method consists in treating the azine with antimony pentachloride in the presence of nitrobenzene.

I have now discovered that chloro-derivatives possessing a greener shade of blue and a substantially greater fastness to chlorine bleach are obtainable by chlorinating the N-dihydro-1,2,1',2'-anthraquinone-azine with gaseous chlorine in the presence of acetic acid or nitrobenzene or a mixture of the two, the chlorination being carried out preferably at a temperature above 40° C. By following this new procedure the chlorination may be effected quickly and satisfactorily.

The acetic acid which is to be used as a suspension medium may be glacial or may contain a little water, and may be used alone or in admixture with inert organic liquids, and especially nitrobenzene. The chloro-derivatives showing the best resistance to bleach of any produced have been made with acetic acid alone as the suspension medium.

The new process will be illustrated in greater detail by the following examples:

I. *Acetic acid.*—One part of N-dihydro-1,2,1',2'-anthraquinone-azine is suspended in fifteen parts of glacial acetic acid (either fresh or previously used acid may be used) and a stream of dry chlorine is passed into the suspension until the desired shade of color is produced, which can be shown by sampling and dyetesting. The charge is then filtered, washed free from acid with hot water, and the recovered dyestuff is dried and finished in the usual manner.

Satisfactory results have been obtained by carrying out the chlorination at temperatures from 50 to 115° C., but the best results by this method have been secured at a temperature of 90° C. Four typical samples produced showed a chlorine content of 13.47, 13.54, 13.54, and 13.69 per cent respectively. The theory for a dichlor-derivative is 13.89 per cent.

II. *Nitrobenzene.*—One part of N-dihydro-1,2,1'2'-anthraquinone-azine is suspended in fifteen parts of fresh nitrobenzene (or nitrobenzene previously used in the operation) and a stream of dry chlorine gas is passed into the suspension at a temperature of 60–215° C. until the desired shade of color is secured, which can be determined by sampling and dyetesting. The charge is then filtered, the nitrobenzene is removed by washing with alcohol, and the product is finished in the usual manner.

The chlorine content of the satisfactory products produced by this method varied from 14.22 to 24.11 per cent, depending upon the conditions employed. Dyeings from samples showing this wide variation in chlorine content showed no difference on dyetesting in respect to shade or resistance to bleach.

III. *Mixture of acetic acid and nitrobenzene.*—One part of the anthraquinone-azine is suspended in a mixture of equal parts of glacial acetic acid and nitrobenzene so that the ratio of solvent to dyestuff is 15:1. The solvent used may be fresh or solvent previously used in the operation. A stream of dry chlorine gas is passed into the suspension until the desired shade is secured, which can be determined by sampling and dyetesting. The charge is then filtered, washed with hot glacial acetic acid and finally with water, dried, and finished in the usual manner.

This method has been employed with entirely satisfactory results. A temperature of 85° C. was used and the resulting product showed a chlorine content of about 17.0%. In the laboratory the temperature has been varied from 40–115° C. with equally satisfactory results and the chlorine content has varied from 13.28 to 22.26 per cent with no difference in dyetests.

The vat dyestuff produced in the manner above-described possesses great tinctorial value and yields dyeings of a clear greenish-blue shade which are faster to chlorine than those produced by chlorinated derivatives of the aforesaid azine when the chlorination is carried out in accordance with the heretofore known processes.

I claim:—

1. The process of making a chloro-derivative of N-dihydro-1,2,1',2'-anthraquinoneazine which comprises passing dry chlorine gas into a suspension of said azine in a liquid comprising acetic acid.

2. The process of making a chloro-derivative of N-dihydro-1,2,1',2'-anthraquinoneazine which comprises heating said azine with free chlorine in the presence of acetic acid.

3. The process of making a chloro-derivative of N-dihydro-1,2,1',2'-anthraquinoneazine which comprises heating said azine with free chlorine in the presence of glacial acetic acid.

4. The process of making a chloro-derivative of N-dihydro-1,2,1',2'-anthraquinoneazine which comprises passing dry chlorine gas into a suspension of said azine in a liquid comprising acetic acid while maintaining the suspension at a temperature between about 40 and 115° C.

5. The process of making a chloro-derivative of N-dihydro-1,2,1',2'-anthraquinoneazine which comprises passing dry chlorine gas into a suspension of said azine in a liquid comprising acetic acid while maintaining the suspension at a temperature between about 40 and 115° C. until said azine is converted into a poly-chloro-derivative.

6. The process of making a chloro-derivative of N-dihydro-1,2,1',2'-anthraquinoneazine which comprises passing dry chlorine gas into a suspension of said azine in a mixture of acetic acid and an inert organic liquid.

7. The process of making a chloro-derivative of N-dihydro-1,2,1',2'-anthraquinoneazine which comprises passing dry chlorine gas into a suspension of said azine in a mixture of acetic acid and nitrobenzene.

8. The process of making a chloro-derivative of N-dihydro-1,2,1',2'-anthraquinoneazine which comprises heating said azine with chlorine in the presence of a mixture of about equal parts of acetic acid and nitrobenzene.

9. The process of making a chloro-derivative of N-dihydro-1,2,1',2'-anthraquinoneazine which comprises heating said azine with chlorine in the presence of a mixture of glacial acetic acid and nitrobenzene.

10. The process of making a chloro-derivative of N-dihydro-1,2,1',2'-anthraquinoneazine which comprises heating said azine with chlorine in the presence of a mixture of glacial acetic acid and nitrobenzene at a temperature between about 50 and 115° C.

In testimony whereof I affix my signature.

OAKLEY M. BISHOP.